US012615601B2

(12) United States Patent
Cozzo et al.

(10) Patent No.: US 12,615,601 B2
(45) Date of Patent: Apr. 28, 2026

(54) UPLINK TRANSMISSIONS BASED ON SYNCHRONIZATION SIGNALS AND PHYSICAL BROADCAST CHANNEL BLOCK RECEPTIONS

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 488 days.

(21) Appl. No.: 18/049,615

(22) Filed: Oct. 25, 2022

(65) Prior Publication Data

US 2023/0147154 A1 May 11, 2023

Related U.S. Application Data

(60) Provisional application No. 63/276,394, filed on Nov. 5, 2021.

(51) Int. Cl.
H04W 74/08 (2024.01)
H04W 52/24 (2009.01)
(Continued)

(52) U.S. Cl.
CPC ....... H04W 56/001 (2013.01); H04W 52/242 (2013.01); H04W 74/0841 (2013.01); H04W 74/0833 (2013.01); H04W 74/0836 (2024.01)

(58) Field of Classification Search
None
See application file for complete search history.

(56) References Cited

U.S. PATENT DOCUMENTS 10,652,002 B2 * 5/2020 Nam ..................... H04L 5/0053
11,722,273 B2 * 8/2023 Manolakos ........... H04L 27/261
370/329

(Continued)

FOREIGN PATENT DOCUMENTS

KR 10-2020-0015526 A 2/2020
WO 2021109915 A1 6/2021

OTHER PUBLICATIONS

Use of NCD-SSB instead of CD-SSB for RedCap UEs, eg3GPP TSG-RAN WG2 #116-e, Nov. 1-12, 2021 (Year: 2021).*

(Continued)

*Primary Examiner* — Khaled M Kassim
*Assistant Examiner* — Ahmed Saifuddin

(57) ABSTRACT

Apparatuses and methods for spatial setting determination based on synchronization signals and physical broadcast channel (SS/PBCH) block receptions. A method performed by a user equipment (UE) in a wireless communication system includes receiving first information for a first set of indexes for synchronization signals and physical broadcast channel (SS/PBCH) blocks, a first SS/PBCH block corresponding to a first index from the first set of indexes, second information for a second set of indexes for SS/PBCH blocks, and a second SS/PBCH block corresponding to a second index from the second set of indexes. The method further includes determining a physical cell identity (PCI) of a serving cell based on the first SS/PBCH block and a path-loss based on the second SS/PBCH block. The first SS/PBCH block and the second SS/PBCH block have a same transmission power.

17 Claims, 15 Drawing Sheets

1200

1210 — UE receives information for a first set of CD-SSBs and a second set of CD-SSBs 1220 — UE selects one or more CD-SSBs from the first set and one or more CD-SSBs from the second set based on RSRP measurements being above a first and a second threshold, respectively 1230 — UE selects the one or more CD-SSBs of a set among the first and second sets based on the largest RSRP measurements 1240 — UE transmits a PRACH in an RO using a first spatial setting associated with the selected CD-SSB 1250 — UE receives a PDCCH scheduling a RAR based on a second spatial setting associated with the selected NCD-SSB

(51) Int. Cl.
  H04W 56/00     (2009.01)
  H04W 74/0833     (2024.01)
  H04W 74/0836     (2024.01)

(56)     References Cited

U.S. PATENT DOCUMENTS

| | | | | |
|---|---|---|---|---|
| 2019/0223205 | A1* | 7/2019 | Papasakellariou | ........ H04L 5/00 |
| 2021/0136591 | A1* | 5/2021 | Si | .......................... H04L 5/0053 |
| 2021/0288776 | A1 | 9/2021 | Hwang et al. | |
| 2021/0306895 | A1 | 9/2021 | Chen et al. | |
| 2021/0328737 | A1* | 10/2021 | Manolakos | ......... H04L 27/2662 |
| 2022/0408348 | A1* | 12/2022 | Li | .......................... H04W 48/16 |
| 2023/0044766 | A1* | 2/2023 | Lei | .................... H04W 74/0833 |
| 2023/0074775 | A1* | 3/2023 | Lei | ........................ H04L 5/0091 |

OTHER PUBLICATIONS

International Search Report and Written Opinion issued Feb. 24, 2023 regarding International Application No. PCT/KR2022/017254, 7 pages.

Ericsson, "Use of NCD-SSB instead of CD-SSB for RedCap UEs", R2-2110773, 3GPP TSG-RAN WG2 #116-e, Oct. 2021, 7 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

Extended European Search Report issued Jan. 15, 2025 regarding Application No. 22890448.8, 6 pages.

* cited by examiner

*600*
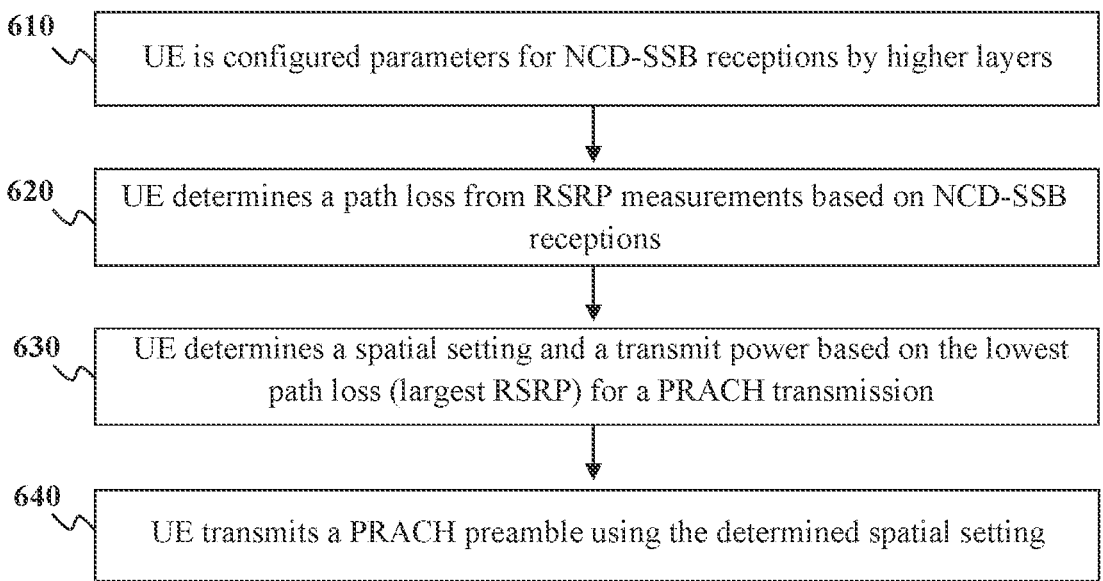
610   UE is configured parameters for NCD-SSB receptions by higher layers
620   UE determines a path loss from RSRP measurements based on NCD-SSB receptions
630   UE determines a spatial setting and a transmit power based on the lowest path loss (largest RSRP) for a PRACH transmission
640   UE transmits a PRACH preamble using the determined spatial setting
FIG. 6

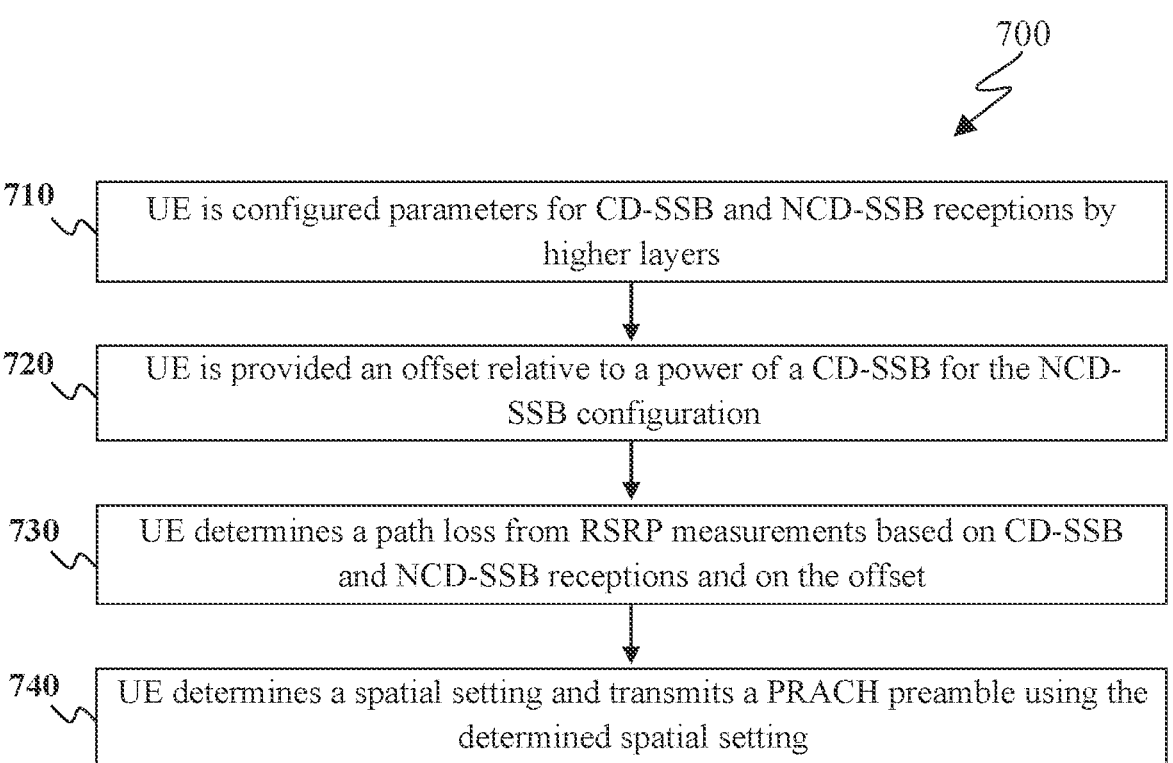

*700*

710 UE is configured parameters for CD-SSB and NCD-SSB receptions by higher layers

720 UE is provided an offset relative to a power of a CD-SSB for the NCD-SSB configuration

730 UE determines a path loss from RSRP measurements based on CD-SSB and NCD-SSB receptions and on the offset

740 UE determines a spatial setting and transmits a PRACH preamble using the determined spatial setting

810 — UE is configured NCD-SSB resources by higher layers

820 — UE is provided an indication to use NCD-SSB for measurements for spatial setting determination during initial access 830 — UE determines a path loss from RSRP measurements based on receptions of NCD-SSB 840 — UE determines a spatial setting and transmits a PRACH preamble using the determined spatial setting

900

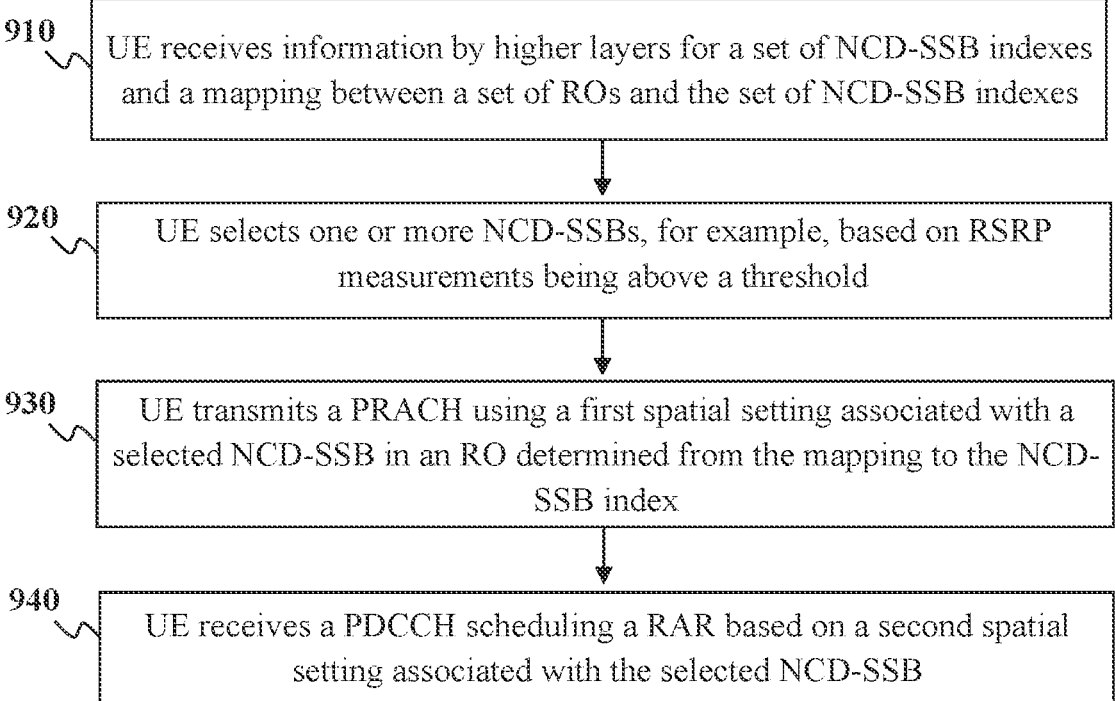

910 — UE receives information by higher layers for a set of NCD-SSB indexes and a mapping between a set of ROs and the set of NCD-SSB indexes 920 — UE selects one or more NCD-SSBs, for example, based on RSRP measurements being above a threshold 930 — UE transmits a PRACH using a first spatial setting associated with a selected NCD-SSB in an RO determined from the mapping to the NCD-SSB index 940 — UE receives a PDCCH scheduling a RAR based on a second spatial setting associated with the selected NCD-SSB

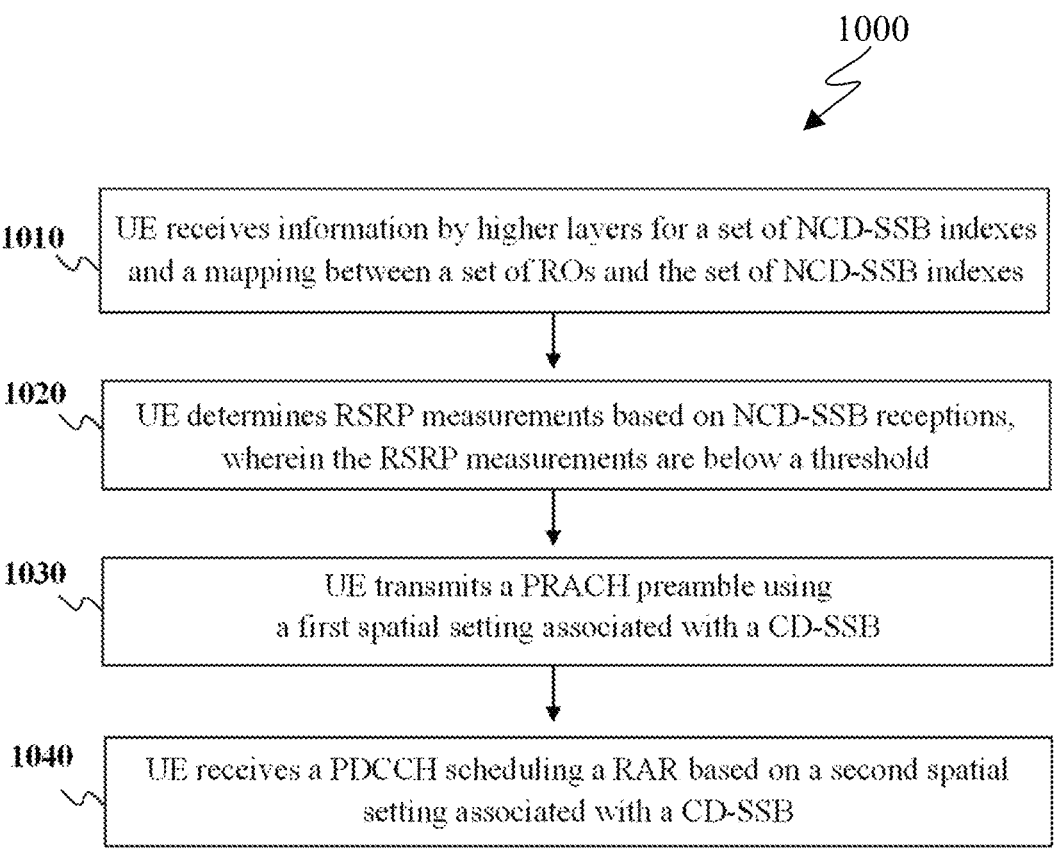

1010 — UE receives information by higher layers for a set of NCD-SSB indexes and a mapping between a set of ROs and the set of NCD-SSB indexes 1020 — UE determines RSRP measurements based on NCD-SSB receptions, wherein the RSRP measurements are below a threshold 1030 — UE transmits a PRACH preamble using a first spatial setting associated with a CD-SSB 1040 — UE receives a PDCCH scheduling a RAR based on a second spatial setting associated with a CD-SSB

FIG. 10

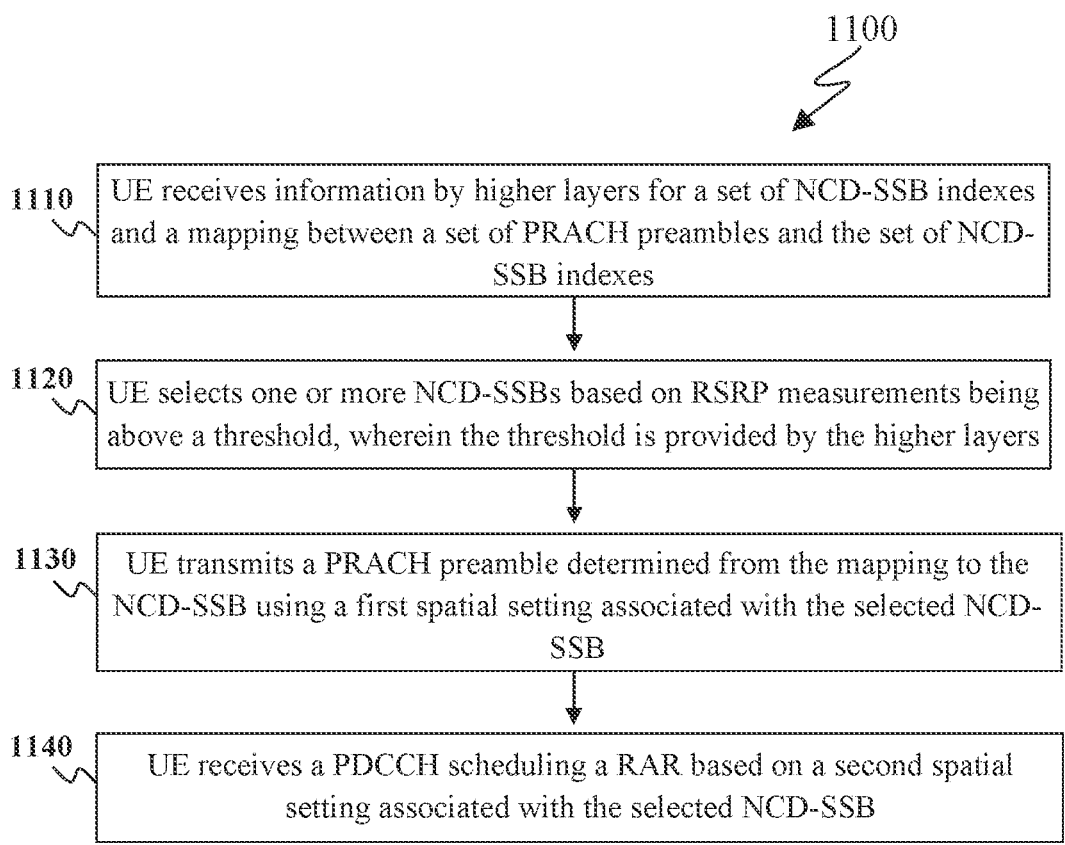

1100

1110   UE receives information by higher layers for a set of NCD-SSB indexes and a mapping between a set of PRACH preambles and the set of NCD-SSB indexes 1120   UE selects one or more NCD-SSBs based on RSRP measurements being above a threshold, wherein the threshold is provided by the higher layers 1130   UE transmits a PRACH preamble determined from the mapping to the NCD-SSB using a first spatial setting associated with the selected NCD-SSB 1140   UE receives a PDCCH scheduling a RAR based on a second spatial setting associated with the selected NCD-SSB

FIG. 11

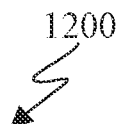

1200

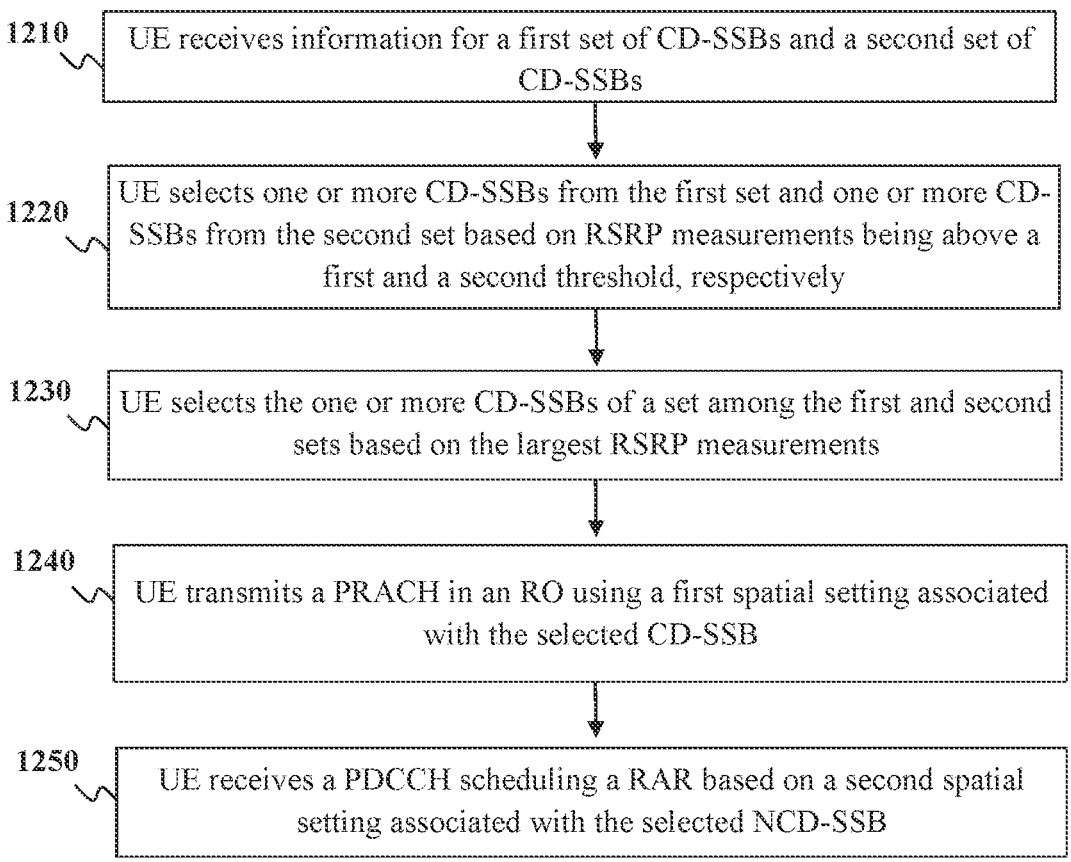

1210    UE receives information for a first set of CD-SSBs and a second set of CD-SSBs 1220    UE selects one or more CD-SSBs from the first set and one or more CD-SSBs from the second set based on RSRP measurements being above a first and a second threshold, respectively 1230    UE selects the one or more CD-SSBs of a set among the first and second sets based on the largest RSRP measurements 1240    UE transmits a PRACH in an RO using a first spatial setting associated with the selected CD-SSB 1250    UE receives a PDCCH scheduling a RAR based on a second spatial setting associated with the selected NCD-SSB

FIG. 12

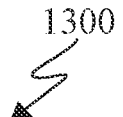

1300

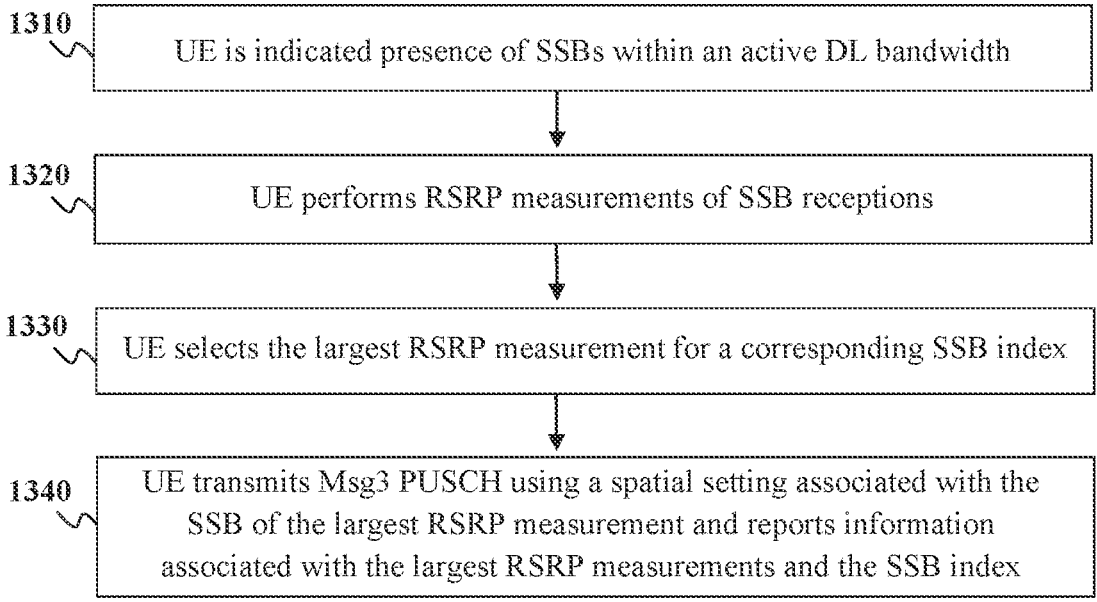

1310 — UE is indicated presence of SSBs within an active DL bandwidth

1320 — UE performs RSRP measurements of SSB receptions

1330 — UE selects the largest RSRP measurement for a corresponding SSB index

1340 — UE transmits Msg3 PUSCH using a spatial setting associated with the SSB of the largest RSRP measurement and reports information associated with the largest RSRP measurements and the SSB index

FIG. 13

1400

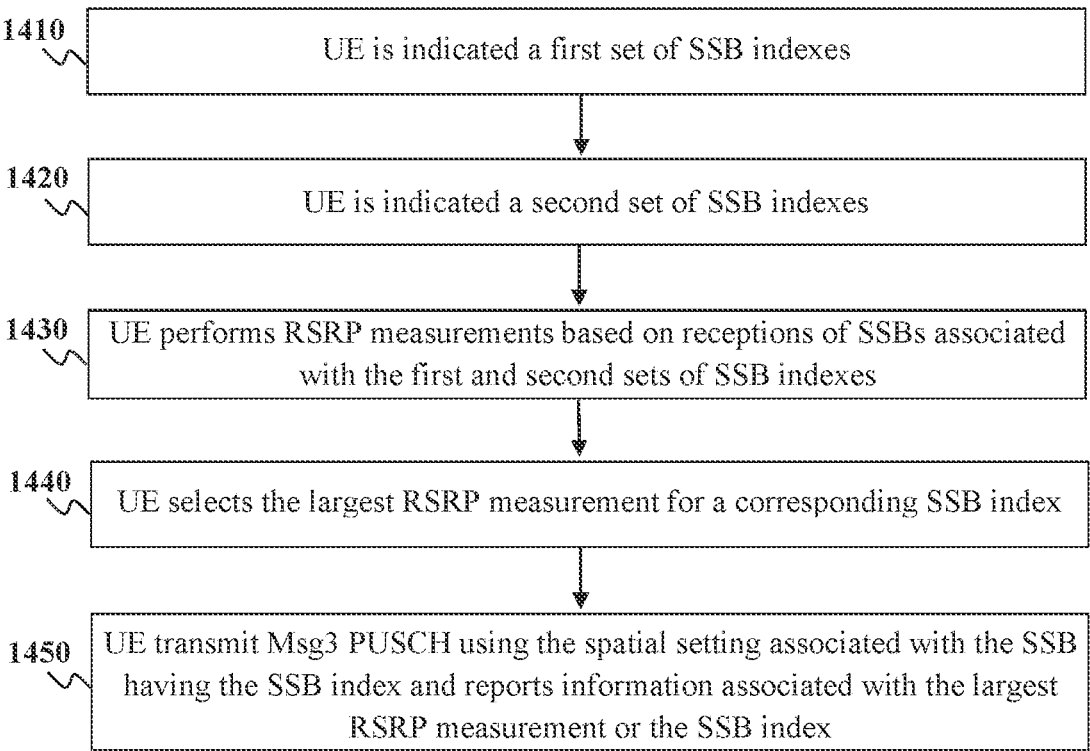

1410 — UE is indicated a first set of SSB indexes

1420 — UE is indicated a second set of SSB indexes

1430 — UE performs RSRP measurements based on receptions of SSBs associated with the first and second sets of SSB indexes 1440 — UE selects the largest RSRP measurement for a corresponding SSB index 1450 — UE transmit Msg3 PUSCH using the spatial setting associated with the SSB having the SSB index and reports information associated with the largest RSRP measurement or the SSB index

FIG. 14

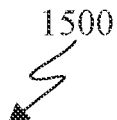
1500
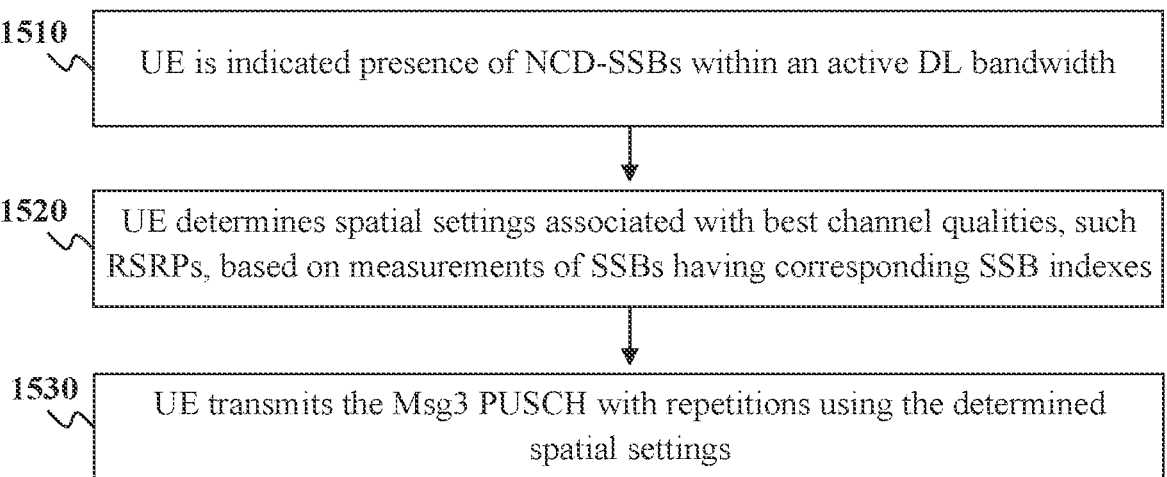
1510    UE is indicated presence of NCD-SSBs within an active DL bandwidth
1520    UE determines spatial settings associated with best channel qualities, such RSRPs, based on measurements of SSBs having corresponding SSB indexes
1530    UE transmits the Msg3 PUSCH with repetitions using the determined spatial settings
FIG. 15

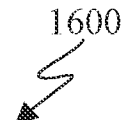

1600

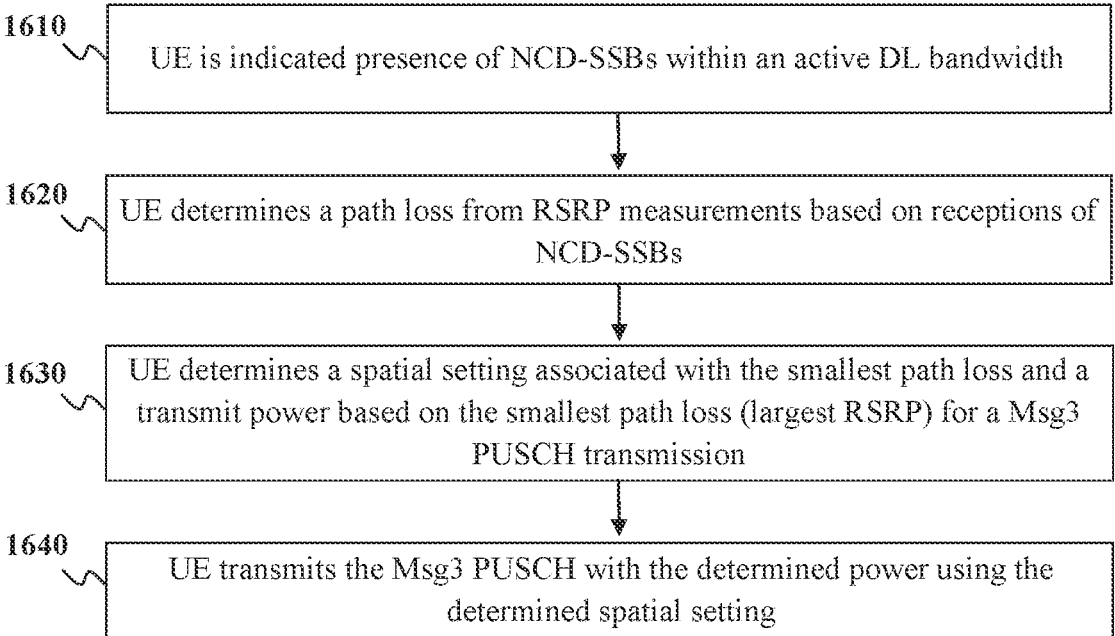

1610 — UE is indicated presence of NCD-SSBs within an active DL bandwidth

1620 — UE determines a path loss from RSRP measurements based on receptions of NCD-SSBs 1630 — UE determines a spatial setting associated with the smallest path loss and a transmit power based on the smallest path loss (largest RSRP) for a Msg3 PUSCH transmission 1640 — UE transmits the Msg3 PUSCH with the determined power using the determined spatial setting

FIG. 16

UPLINK TRANSMISSIONS BASED ON SYNCHRONIZATION SIGNALS AND PHYSICAL BROADCAST CHANNEL BLOCK RECEPTIONS

CROSS-REFERENCE TO RELATED APPLICATION AND CLAIM OF PRIORITY

This application claims priority under 35 U.S.C. § 119(e) to U.S. Provisional Patent Application No. 63/276,394 filed on Nov. 5, 2021. The above-identified provisional patent application is hereby incorporated by reference in its entirety.

TECHNICAL FIELD

The present disclosure relates generally to wireless communication systems and, more specifically, the present disclosure relates to an apparatus and method for determining configurations for transmissions or receptions based on synchronization signals and physical broadcast channel (SS/PBCH) block receptions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to an apparatus and method for spatial setting determination based on synchronization and physical broadcast channel block receptions.

In one embodiment, a user equipment (UE) is provided. The UE includes a transceiver configured to receive first information for a first set of indexes for SS/PBCH blocks, a first SS/PBCH block corresponding to a first index from the first set of indexes, second information for a second set of indexes for SS/PBCH blocks, and a second SS/PBCH block corresponding to a second index from the second set of indexes. The UE further includes a processor operably coupled to the transceiver. The processor is configured to determine a physical cell identity (PCI) of a serving cell based on the first SS/PBCH block and a path-loss based on the second SS/PBCH block. The first SS/PBCH block and the second SS/PBCH block have a same transmission power.

In another embodiment, a base station (BS) is provided. The BS includes a transceiver configured to transmit first information for a first set of indexes for SS/PBCH blocks, a first SS/PBCH block corresponding to a first index from the first set of indexes, second information for a second set of indexes for SS/PBCH blocks, and a second SS/PBCH block corresponding to a second index from the second set of indexes. The BS further includes a processor operably coupled to the transceiver. The processor is configured to determine a PCI of a serving cell based on the first SS/PBCH block and a path-loss based on the second SS/PBCH block.

The first SS/PBCH block and the second SS/PBCH block have a same transmission power.

In yet another embodiment, a method is provided. The method includes receiving first information for a first set of indexes for SS/PBCH blocks, a first SS/PBCH block corresponding to a first index from the first set of indexes, second information for a second set of indexes for SS/PBCH blocks, and a second SS/PBCH block corresponding to a second index from the second set of indexes. The method further includes determining a PCI of a serving cell based on the first SS/PBCH block and a path-loss based on the second SS/PBCH block. The first SS/PBCH block and the second SS/PBCH block have a same transmission power.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates an example method for a UE to determine a spatial setting for a PRACH transmission based on NCD-SSB receptions according to embodiments of the present disclosure;

FIG. 7 illustrates another example method for a UE to determine a spatial setting for a PRACH transmission based on NCD-SSB receptions according to embodiments of the present disclosure;

FIG. 9 illustrates an example method for a UE transmitting a PRACH preamble in a set of ROs according to embodiments of the present disclosure;

FIG. 10 illustrates an example method for a UE transmitting a PRACH preamble in a set of ROs according to embodiments of the present disclosure;

FIG. 11 illustrates an example method for a UE transmitting a PRACH preamble in an RO using a spatial setting according to embodiments of the present disclosure;

FIG. 12 illustrates an example method for a UE transmitting a PRACH preamble in an RO using a spatial setting determined from a first and a second CD-SSB configuration, wherein the first and second CD-SSBs are associated to a same or a different cell according to embodiments of the present disclosure;

FIG. 13 illustrates an example method 1300 for a UE to perform RSRP measurements based on receptions of NCD-SSBs and to report information of a channel quality in a Msg3 PUSCH transmission according to embodiments of the present disclosure;

FIG. 14 illustrates an example method for a UE to perform RSRP measurements based on receptions of SSBs and to report information of a channel quality in a Msg3 PUSCH transmission according to embodiments of the present disclosure;

FIG. 15 illustrates an example method for a UE to transmit Msg3 PUSCH with repetitions by cycling over spatial settings determined by measurements based on receptions of NCD-SSBs according to embodiments of the present disclosure; and FIG. 16 illustrates an example method for a UE to estimate path loss values associated to receptions of NCD-SSBs and used for determining a power for a Msg3 PUSCH transmission according to embodiments of the present disclosure.

DETAILED DESCRIPTION

Figure 1:
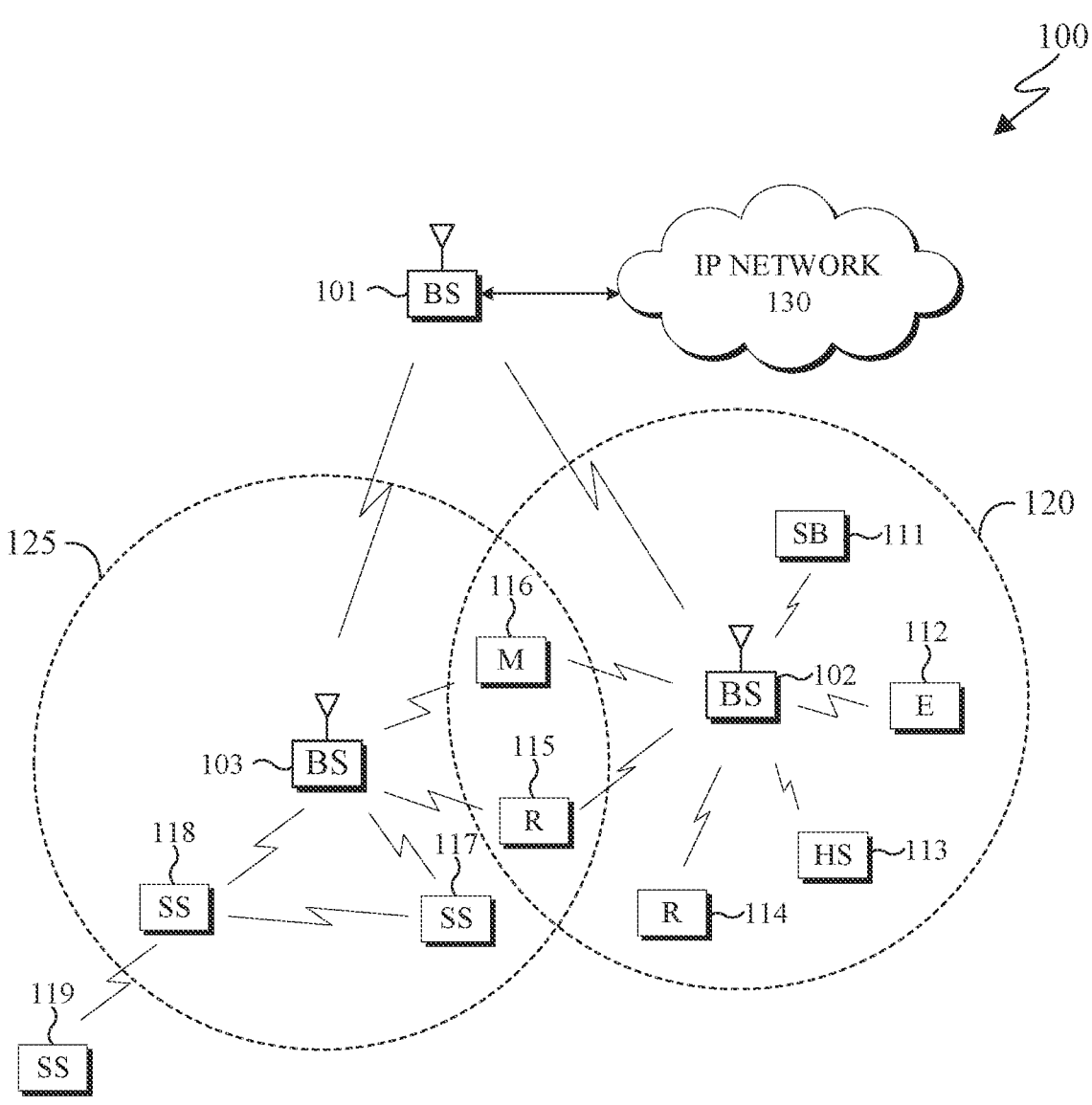
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.0.0, "NR; Physical channels and modulation" ("REF1"); 3GPP TS 38.212 v16.0.0, "NR; Multiplexing and channel coding" ("REF2"); 3GPP TS 38.213 v16.0.0, "NR; Physical layer procedures for control" ("REF3"); 3GPP TS 38.214 v16.0.0, "NR; Physical layer procedures for data" ("REF4"); 3GPP TS 38.321 v15.8.0, "NR; Medium Access Control (MAC) protocol specification" ("REF5"); and 3GPP TS 38.331 v15.8.0, "NR; Radio Resource Control (RRC) protocol specification" ("REF6").

A serving cell is associated to a CD-SSB located on the synchronization raster. A gNB can also configure Non-Cell-Defining SSB (NCD-SSB). For example, for a UE in connected mode, the gNB can configure SSB-based RRM measurements on CD-SSBs and/or NCD-SSBs. When in a serving cell both CD-SSBs and NCD-SSBs are configured, the PCIs of CD-SSBs and NCD-SSBs can be same. The gNB can configure NCD-SSBs for a UE in connected mode for different functionalities, such as RLM, BFD, link recovery, RO selection, in TCI-states or for any other functionality other than RRM measurements. It is also possible that for a UE in idle or inactive mode, the gNB can configure NCD-SSBs that the UE can use to perform measurements, however, to read SIB the UE needs to use CD-SSBs.

During the initial cell search, a UE acquires/detects an SSB transmitted by a gNB. The gNB can transmit multiple SSBs with different quasi-collocation properties, also referred to as beams, and the UE typically acquires the SSB associated with the quasi-collocation properties that best match the ones of the UE. Then, assuming beam reciprocity for the DL and UL transmissions, the UE transmits PRACH according to a spatial setting that is determined from the detected SSB. The gNB can transmit CD-SSBs or can also transmit NCD-SSBs with different quasi co-location (QCL) properties in different SS/PBCH block indexes respect to the SS/PBCH block indexes indicated by CD-SSBs and same QCL properties in same SS/PBCH block indexes respect to the SS/PBCH block indexes indicated by CD-SSBs, and the UE can acquire the SSB associated with the best quasi co-location properties from the transmitted CD-SSBs or NCD-SSBs.

In order to minimize an overhead associated with the SS/PBCH blocks, a gNB transmits a SSB with a relatively wide beam to cover a corresponding wide area on a cell. Typically, there is a coverage imbalance between DL transmissions and UL transmissions that results due to, for example, a different antenna gain (larger at the gNB) or a different noise figure (larger at the UE). To compensate for such coverage imbalance, the UE can transmit a PRACH with a narrower beam including changing the beam/spatial setting of the PRACH transmission when the UE does not detect a random-access response (RAR) message addressing the UE in response to the PRACH transmission. The UE can use a same spatial setting as for a PRACH transmission to transmit a Msg3 PUSCH that is scheduled by a RAR message that the UE detects in response to the PRACH transmission.

The present disclosure relates to determining spatial settings for transmission during initial access. The present disclosure relates to determining a spatial setting for a PRACH transmission based on an NCD-SSB. The present disclosure also relates to determining a spatial setting for a PRACH transmission based on an indication in SIB. The present disclosure further relates to determining a spatial setting for a Msg3 PUSCH transmission based on CD-SSBs or NCD-SSBs.

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
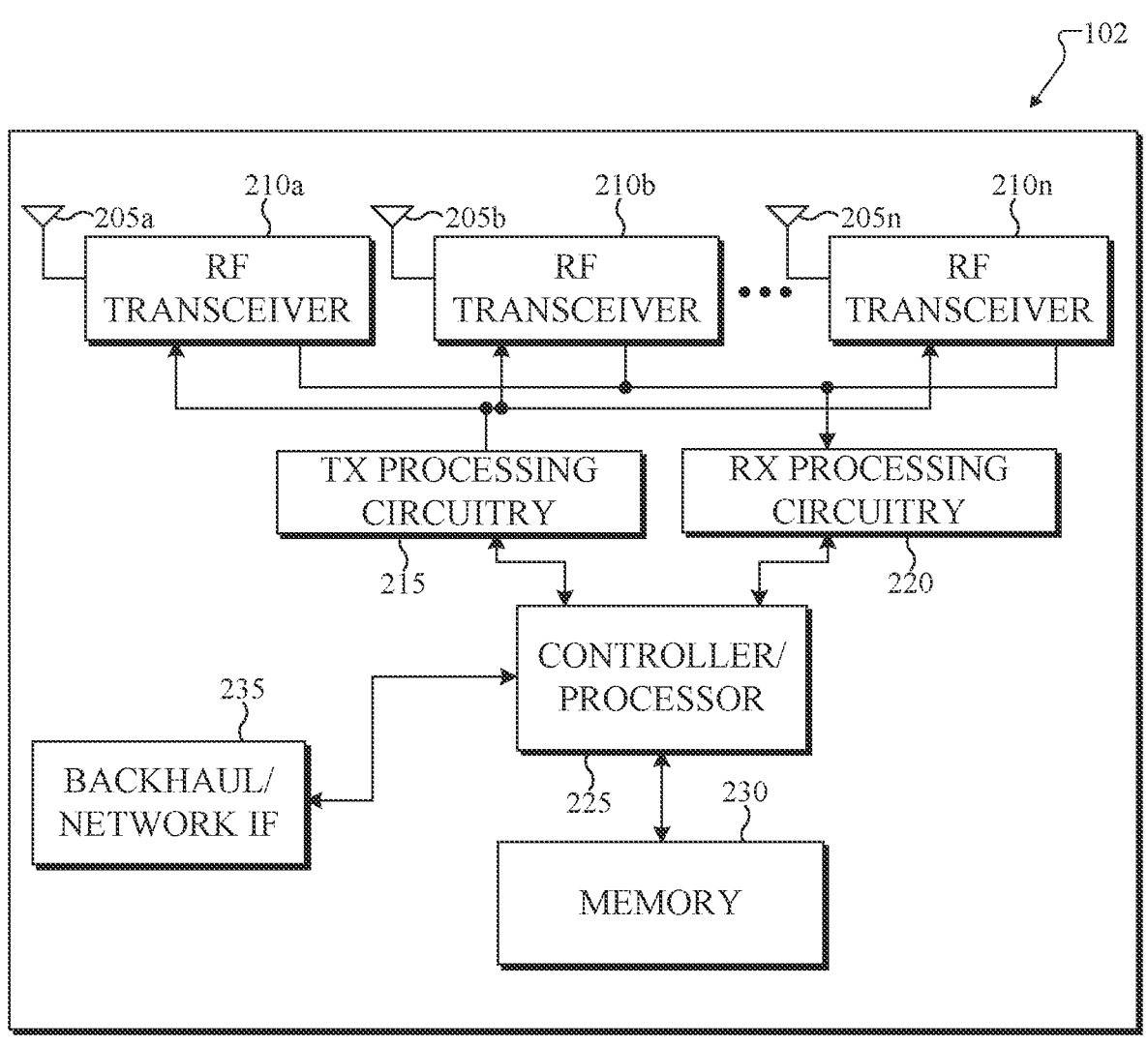
FIG. 2 illustrates an example BS according to embodiments of the present disclosure.
Figure 3:
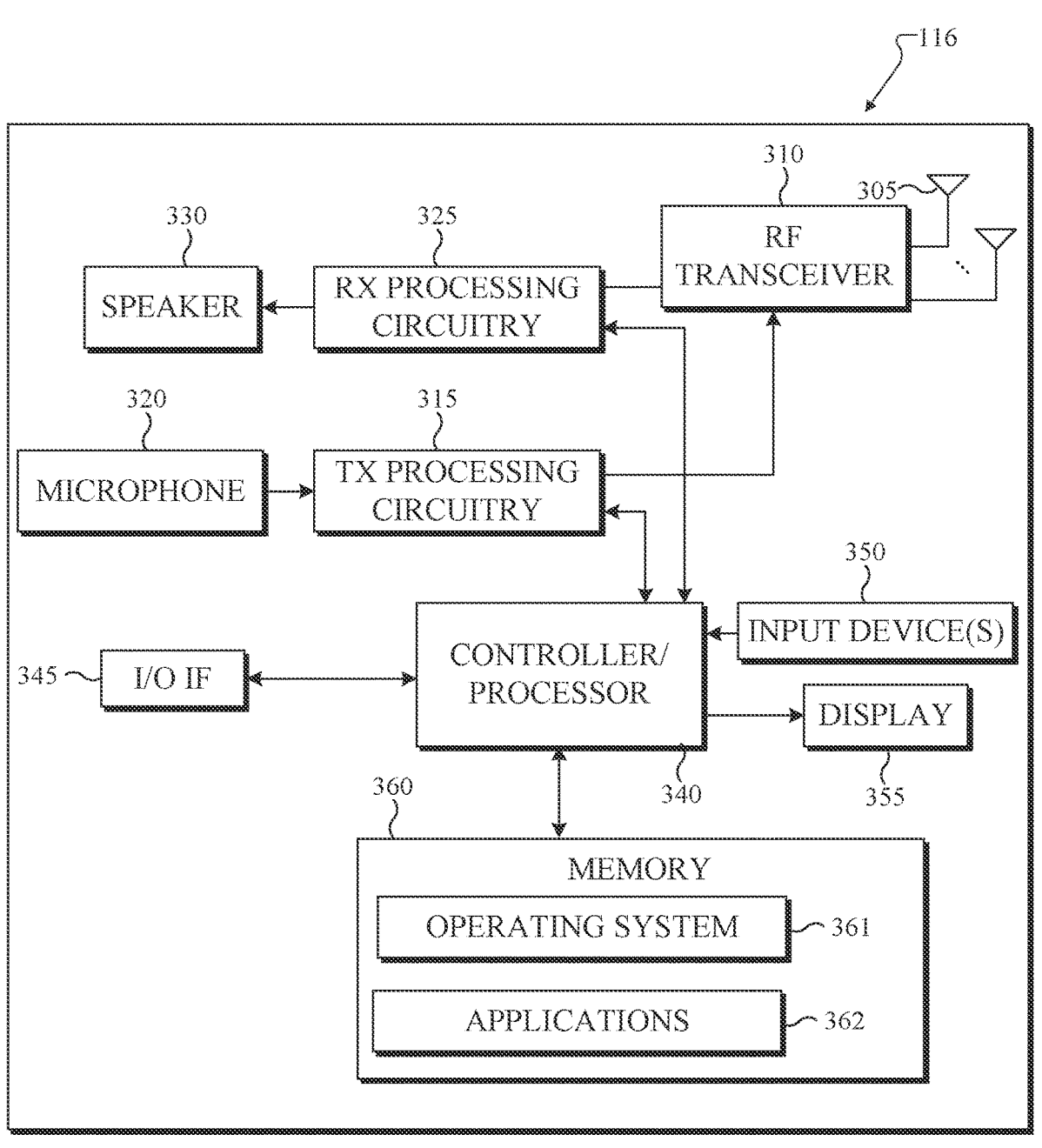
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, LTE, long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for uplink transmissions based on SS/PBCH block receptions. In certain embodiments, and one or more of the BSs 101-103 includes circuitry, programing, or a combination thereof for uplink receptions based on SS/PBCH block transmissions.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support spatial setting determination based on synchronization and physical broadcast channel block receptions. Any of a wide variety of other functions could be supported in the BS 102 by the controller/ processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BS s over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
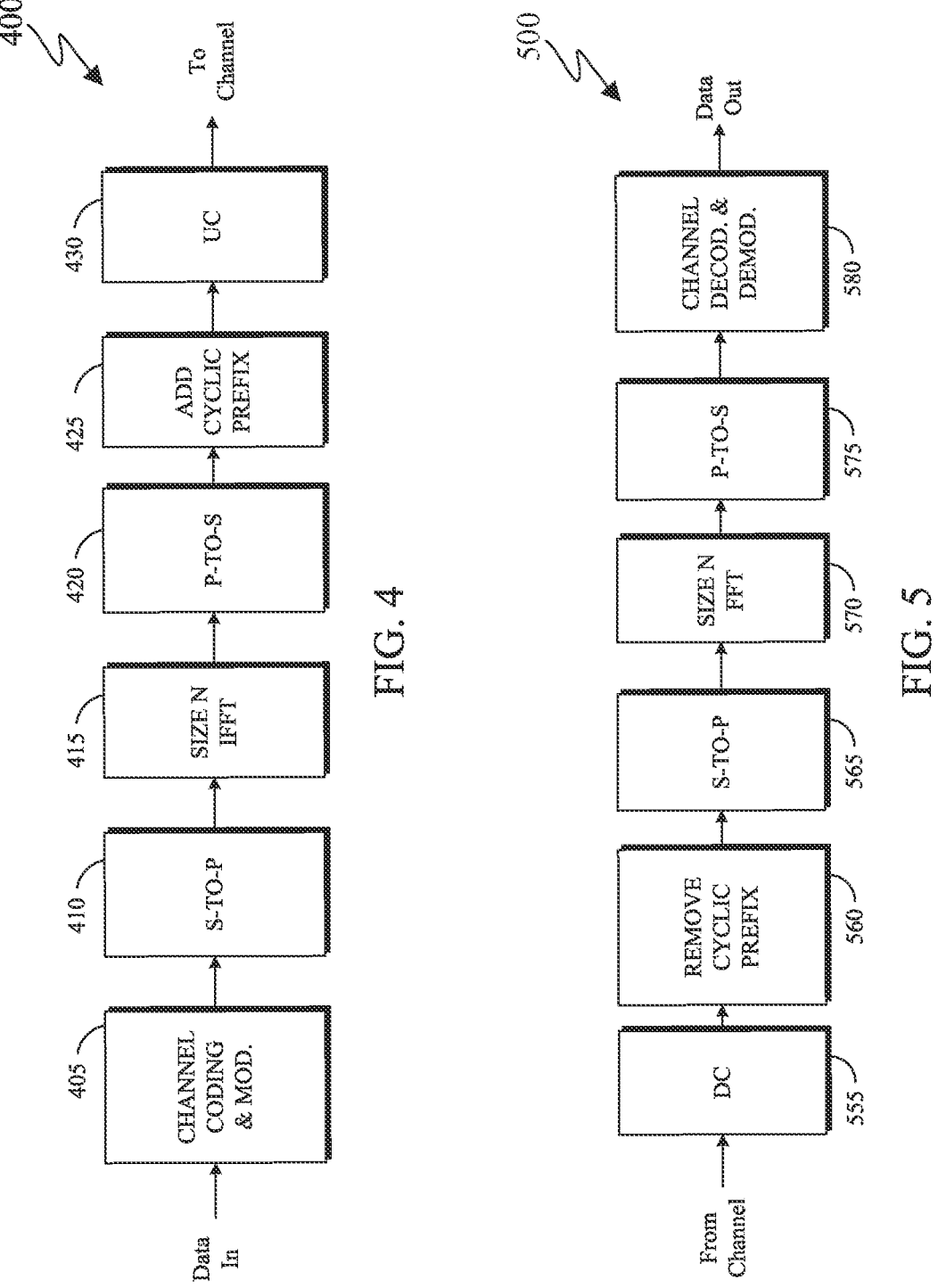
FIGS. 4 and 5 illustrate example wireless transmit and receive paths according to embodiments of the present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support triggering methods for cell-specific or UE-group-specific adaptation for network energy savings as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A random access (RA) procedure can be initiated to fulfill several purposes including for example one of the following ones: establish RRC connection (to go from RRC_IDLE to RRC_CONNECTED), re-establish RRC connection after radio link failure (RLF), on-demand system information (SI) request, UL synchronization, scheduling request (SR), positioning, link recovery—also known as beam failure recovery (BFR). A physical random access procedure is triggered upon request of a PRACH transmission by higher layers at a UE or by a PDCCH order from a serving gNB. Random access (RA) can operate in two modes: (i) contention-based random access (CBRA) where UEs within a serving cell can share same RA resources and there is therefore a possibility of collision among RA attempts from different UEs, and (ii) contention-free random access (CFRA) where a UE has dedicated RA resources that can be, for example, indicated by a serving gNB and may not be shared with other UEs so that RA collisions can be avoided.

A 4-step random access procedure, also known as a Type-1 L1 random access procedure includes step-1: UE transmission of a Physical Random Access Channel (PRACH) preamble (Msg1); step-2: gNB transmission of Random Access Response (RAR) message with a PDCCH/PDSCH (Msg2); step-3: UE transmission of a contention resolution message and when applicable, the transmission of a PUSCH scheduled by a RAR UL grant (Msg3); and step-4: gNB transmission of a contention resolution message (Msg4).

Step-1—Prior to initiation of the physical random access procedure, Layer 1 of a UE receives from higher layers a set of SS/PBCH block indexes and provides to higher layers a corresponding set of RSRP measurements. Layer 1 receives the configuration of physical random access channel (PRACH) transmission parameters (PRACH preamble format, time resources, and frequency resources for PRACH transmission). In step 1, the UE transmits a PRACH using the selected PRACH format with a transmission power determined depending on whether the PRACH transmission is triggered upon request by higher layers or is in response to a detection of a PDCCH order from a serving gNB and depending on the action associated with the PDCCH order.

Step-2—Random access response (RAR or Msg2) in step-2 is a PDCCH/PDSCH transmission that the UE receives on a DL BWP: the initial DL BWP of the PCell/SpCell for the case of initial access, i.e., (re-)establishing RRC connection, or the active DL BWP (with the same BWP-index as the active UL BWP) of an SpCell for other random access triggers except for initial access. If the active DL BWP index (of the SpCell) is not equal to active UL BWP index (of the serving cell), then switch the active DL BWP to one with the same BWP index. The sub-carrier spacing (SCS) for PDCCH in RAR message is the SCS for Type1-PDCCH CSS set. The PDCCH scheduling the PDSCH with the RAR provides a DCI format 1_0 and the UE monitors PDCCH candidates during a configured time window in a Type1-PDCCH common search space (CSS) set of the SpCell identified by the RA-RNTI or, for the case of BFR with CFRA, in the search space indicated by recoverySearchSpaceId of the SpCell identified by the C-RNTI. The sub-carrier spacing (SCS) for PDCCH in RAR message is the SCS for Type1-PDCCH CSS set. The SCS for any future PDSCH is also the same SCS as that of the PDSCH providing the RAR, unless the UE is configured an SCS.

Step-3/4—For the case of CFRA or SI request, a correct reception of Msg2/RAR is the last step for the random access procedure. For the case of CBRA, multiple UEs may have used the same PRACH preamble, and further steps are needed to resolve the contention. Furthermore, for the case of random access before a UE is in the RRC_CONNECTED state (i.e., for initial access), the UE and a serving gNB need to exchange further information to set up the connection and that information is provided by a PUSCH transmission (Msg3) for contention resolution request and possibly also for connection setup request, and a PDSCH transmission (Msg4) for contention resolution response and possibly for connection setup response. The contention resolution (and connection set up, if applicable) is considered successful if the UE receives Msg4 within a certain time window after transmission of Msg3 and, for the case that the UE does not have a C-RNTI yet, if the contention resolution ID in Msg4 matches the ID that the UE transmitted in Msg3. Otherwise, the RACH attempt is considered unsuccessful, and the UE needs to perform another RACH attempt unless a configured maximum number of RACH attempts have been already exhausted in which case the entire random access procedure is declared as unsuccessful.

Instead of a 4-step RA procedure, a 2-step RA procedure can be used where a UE can transmit both a PRACH preamble and a PUSCH (MsgA) prior to reception of a corresponding RAR (MsgB).

The SS/PBCH block (SSB) includes primary and secondary synchronization signals (PSS, SSS), each occupying 1 symbol and 127 subcarriers, and PBCH spanning across 3 OFDM symbols and 240 subcarriers. The possible time locations of SSBs within a half-frame are determined by Sub-Carrier Spacing (SCS) and the periodicity of the half-frames where SSBs are transmitted is configured by the network. During a half-frame, different SSBs may be transmitted in different spatial directions (i.e., using different beams, spanning the coverage area of a cell). Within the frequency span of a carrier, multiple SSBs can be transmitted. The Physical Cell Identifiers (PCIs) of SSBs transmitted in different frequency locations can be same or different. When an SSB is associated with a Master Information Block (MIB), or with a Remaining Minimum System Information (RMSI) block that is also referred to as first secondary information block (SIB), the SSB is referred to as a Cell-Defining SSB (CD-SSB) and is the SSB the UE uses to determine a physical cell identity (PCI) of a serving cell providing the SSB. A serving cell is always associated to a CD-SSB located on the synchronization raster.

A gNB can also configure Non-Cell-Defining SSB (NCD-SSB) to a UE. For example, for a UE in connected mode, the gNB can configure SSB-based RRM measurements on CD-SSBs and/or NCD-SSBs. When in a serving cell both CD-SSBs and NCD-SSBs are configured, a same PCI is associated with the CD-SSBs and NCD-SSBs can be same. The gNB can configure NCD-SSBs for a UE in connected mode for different functionalities, such as RLM, BFD, link recovery, RO selection, in TCI-states or for any other functionality other than RRM measurements. It is also possible that for a UE in idle or inactive mode, the gNB can configure NCD-SSBs that the UE can use to perform measurements, however, to read SIB the UE needs to use CD-SSBs.

During the initial cell search, a UE acquires/detects an SSB transmitted by a gNB. The gNB can transmit multiple SSBs with different quasi co-location (QCL) properties, also referred to as beams, and the UE typically acquires the SSB associated with the quasi co-location properties providing one of the largest RSRPs. Then, assuming beam reciprocity for the DL and UL transmissions, the UE can transmit a PRACH according to a spatial setting that is determined from the detected SSB. The gNB can transmit CD-SSBs or can also transmit NCD-SSBs with same or different QCL properties as the CD-SSBs. The QCL properties can be same for a CD-SSB and a NCD-SSB with same index; otherwise, the QCL properties can be different.

In order to minimize an overhead associated with the SS/PBCH blocks (SSBs), a gNB transmits a SSB with a relatively wide beam to cover a corresponding wide area on a cell. Typically, there is a coverage imbalance between DL transmissions and UL transmissions that results due to, for example, a different antenna gain (larger at the gNB) or a different noise figure (larger at the UE). To compensate for such coverage imbalance, the UE can transmit a PRACH with a narrower beam including changing the beam/spatial setting of the PRACH transmission when the UE does not detect a random-access response (RAR) message addressing the UE in response to the PRACH transmission. The UE can use a same spatial setting as for a PRACH transmission to transmit a Msg3 PUSCH that is scheduled by a RAR message that the UE detects in response to the PRACH transmission.

The present disclosure relates to determining spatial settings for transmission during initial access. The present disclosure relates to determining a spatial setting for a PRACH transmission based on CD-SSBs, or NCD-SSBs, or a combination of CD-SSBs and NCD-SSBs, or a combination of a first set of CD-SSBs and a second set of CD-SSBs. The present disclosure also relates to determining a spatial setting for a PRACH transmission based on an indication in a SIB. The present disclosure further relates to determining a spatial setting for a Msg3 PUSCH transmission based on CD-SSBs or NCD-SSBs.

A cell can be associated to one or more NCD-SSBs of a certain periodicity that can be indicated to a UE by higher layers, and may or may not be located on the channel raster associated to a CD-SSB. For example, for a cell associated to a CD-SSB and an NCD-SSB, the frequency of the CD-SSB is provided by absoluteFrequencySSB as described in REF 5, and the frequency of the NCD-SSB can be same or different than the frequency of the CD-SSB. When different, the frequency of NCD-SSB needs also to be provided by a corresponding absoluteFrequencySSB. The time location of CD-SSBs and NCD-SSBs can be same or different. For example, a UE can be indicated by higher layers a time location for a NCD-SSB relative to a time location of a CD-SSB. The transmission power of CD-SSB and NCD-SSB can be same or different and can depend on whether they are both associated to a same serving cell. For example, when CD-SSB and NCD-SSB are associated to a same cell they have the same transmission power. A serving cell can be associated with a CD-SSB and to one or more NCD-SSBs. Alternatively, one or more of the NCD-SSBs can be associated with a non-serving cell.

A UE can be provided a first RACH configuration associated with a CD-SSBs and a second RACH configuration associated with a NCD-SSBs that can be same or differ in one or more parameters and can be provided by higher layers via common RRC signaling, such as by system information, or via UE-specific RRC signaling. For example, the first configuration can be provided by SIB1 and the second configuration can be provided by UE-specific RRC signaling. It is also possible that the first RACH configuration and the second RACH configuration are for same or different cells.

Throughout the disclosure embodiments are described for a first configuration of CD-SSBs and a second configuration of NCD-SSBs, and equally apply for a first configuration of CD-SSBs and a second configuration of CD-SSBs.

A UE can estimate a channel quality by measuring an RSRP of SSB receptions using a spatial setting. A gNB can configure in a SIB whether a UE uses receptions of NZP CSI-RS or CD-SSB or NCD-SSB or a combination of NZP CSI-RS and SSB receptions to determine a channel quality associated to a spatial setting. A configuration in a SIB of NZP CSI-RS resources can be an indication to the UE to use receptions in CSI-RS resources to determine a channel quality associated to a spatial setting. A configuration of NCD-SSB can be an indication to the UE to use receptions in NCD-SSB resources to determine a channel quality associated to a spatial setting. The UE can also use both SSB and NZP CSI-RS receptions, when available, to determine a channel quality associated to a spatial setting.

When a gNB configures NCD-SSB to a UE, the UE can determine a channel quality associated with different spatial settings by performing measurements based on NCD-SSB receptions and transmit a PRACH preamble with the best spatial setting (the one resulting to the largest RSRP). If the gNB does not configure NCD-SSBs, the UE can determine a channel quality associated with different spatial settings by performing measurements based on receptions of CD-SSBs.

It is also possible that, when NCD-SSB is configured, the UE uses both CD-SSB and NCD-SSB resources to determine a spatial setting to transmit a PRACH preamble. When CD-SSB and NCD-SSB resources are transmitted with a same power, a UE performs measurements for one or both of CD-SSBs and NCD-SSBs and selects the spatial setting based on the largest RSRP. When CD-SSB and NCD-SSB are transmitted with different power, the UE can apply a scaling of the RSRP measurements based on an information provided by the gNB for the relative powers of the CD-SSB and the NCD-SSB. For example, when NCD-SSB is transmitted with a different power than a CD-SSB, the gNB can provide an offset relative to a power of a CD-SSB, for example, in a SIB or by UE-specific RRC signaling providing information for the NCD-SSB.

A gNB can indicate NZP CSI-RS resources in a SIB, a UE can use receptions in the NZP CSI-RS resources to select a spatial setting for PRACH transmission and transmit a PRACH preamble with the best spatial setting (the one resulting to the largest RSRP). If NZP CSI-RS resources are not indicated by the SIB, a UE can determine a channel quality associated with different spatial settings by performing measurements based on CD-SSB receptions. A gNB can indicate to a UE parameters for a NCD-SSB by higher layers and the UE can determine a channel quality associated with different spatial settings by performing measurements based on NCD-SSB receptions.

FIG. 6 illustrates an example method 600 for a UE to determine a spatial setting for a PRACH transmission based on NCD-SSB receptions according to embodiments of the present disclosure. The embodiment of the method 600 for a UE to determine a spatial setting for a PRACH transmission based on a NCD-SSB receptions illustrated in FIG. 6 is for illustration only. FIG. 6 does not limit the scope of this disclosure to any particular implementation of the method 600 for a UE to determine a spatial setting for a PRACH transmission based on NCD-SSB receptions.

As illustrated in FIG. 6, In step 610, a UE (such as the UE 116) is configured parameters for NCD-SSB receptions by higher layers. In step 620, the UE determines a path loss from RSRP measurements based on NCD-SSB receptions. In step 630, the UE determines a spatial setting and a transmit power based on the lowest path loss (largest RSRP) for a PRACH transmission. In step 640, the UE transmits a PRACH with a determined spatial setting and a determined transmit power.

FIG. 7 illustrates another example method 700 for a UE to determine a spatial setting for a PRACH transmission based on NCD-SSB receptions according to embodiments of the present disclosure. The embodiment of the method 700 for a UE to determine a spatial setting for a PRACH transmission based on NCD-SSB receptions illustrated in FIG. 7 is for illustration only. FIG. 7 does not limit the scope of this disclosure to any particular implementation of the method 700 for a UE to determine a spatial setting for a PRACH transmission based on NCD-SSB receptions.

As illustrated in FIG. 7, in step 710, a UE (such as the UE 116) is configured parameters for CD-SSB and NCD-SSB receptions by higher layers. In step 720, the UE is provided an offset relative to a power of a CD-SSB for the NCD-SSB configuration. In step 730, the UE determines a path loss from RSRP measurements based on CD-SSB and NCD-SSB receptions and on the offset. In step 740, the UE determines a spatial setting and transmits a PRACH preamble using the determined spatial setting.

Figure 8:
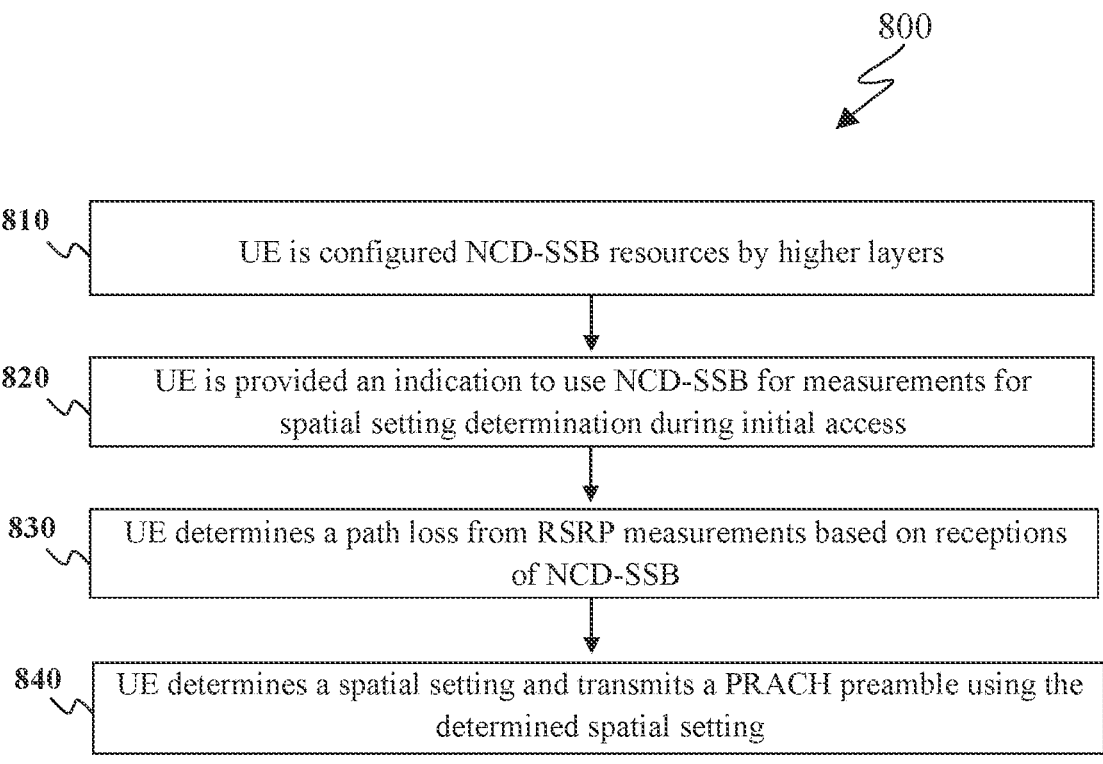
FIG. 8 illustrates an example method for a UE to determine a spatial setting for a PRACH transmission based on an indication of NCD-SSB receptions to use for path loss estimation according to embodiments of the present disclosure.

FIG. 8 illustrates an example method 800 for a UE to determine a spatial setting for a PRACH transmission based on an indication of resources to use for path loss estimation according to embodiments of the disclosure. The embodiment of the method 800 for a UE to determine a spatial setting for a PRACH transmission based on an indication of resources to use for path loss estimation illustrated in FIG. 8 is for illustration only. FIG. 8 does not limit the scope of this disclosure to any particular implementation of the method 800 for a UE to determine a spatial setting for a PRACH transmission based on an indication of resources to use for path loss estimation.

As illustrated in FIG. 8, In step 810, a UE (such as the UE 116) (such as the UE 116) is configured NCD-SSB resources by higher layers. In step 820, the UE is provided an indication to use NCD-SSB for measurements for spatial setting determination during initial access. In step 830, the UE determines a path loss from RSRP measurements based on receptions of NCD-SSB. In step 840, the UE determines a spatial setting and transmits a PRACH preamble using the determined spatial setting.

A gNB can configure, through a SIB, RO indices that can be used by UEs to transmit PRACH in sets of N ROs. When a UE selects a set of N ROs, the UE transmits PRACH preambles in the N ROs before the UE receives a RAR. Different sets of ROs can have a same or different number of ROs. The RO indices in a set of ROs can be sequential or intermittent. For example, a gNB can indicate that ROs with indices from 0 to M−1 can be used in sets of N ROs for the transmission of PRACH preambles. The UE can transmit N PRACH preambles in the N ROs cycling over N spatial settings wherein, for example, the UE can determine the spatial settings based on receptions of reference signals, such as CSI-RS, or based on receptions of NCD-SSBs from the gNB. Alternatively, the UE can transmit a same PRACH preamble in the N ROs cycling over N spatial settings. It is also possible that a UE is configured to use multiple sets of ROs, wherein the RO indices in two sets of ROs may have sequential or non-sequential indices. For example, a UE can use S sets of ROs and transmit PRACH with different spatial settings in different sets of ROs and transmit PRACH with a same spatial setting in the ROs within a set of ROs, or a UE can transmit PRACH with different spatial settings in the ROs within a set and repeat the same pattern of PRACH transmissions with different spatial settings in the other sets. When a gNB configures a UE for PRACH transmission in multiple sets of ROs, the UE would transmit the PRACH preambles in all ROs in the S sets of ROs before the UE receives a RAR.

A gNB can provide, in a SIB or by UE-specific RRC signaling, a set of NCD-SSB configurations and a mapping between a set of ROs and a set of NCD-SSB configurations. The gNB can also configure a mapping between a set of PRACH preambles and/or ROs and a set of NCD-SSB configurations. The gNB can configure cell specific random-access parameters in a RACH-ConfigCommon IE by a RRC parameter, for example a ncd-ssb-perRACH-OccasionAndCB-PreamblesPerSSB that provides the information about the number of NCD-SSBs per RACH occasion and the number of Contention Based preambles per NCD-SSB. It is possible that the gNB configures parameters for random access procedures for both CD-SSBs and NCD-SBBs. The configured ROs can be common to CD-SSBs and NCD-SSBs and the PRACH preambles can be partitioned, with a first set of PRACH preambles configured for CD-SSBs and a second set of PRACH preambles configured for NCD-SSBs. It is also possible that the gNB configures parameters for random access procedures for both CD-SSBs and NCD-SBBs, and that the configured PRACH preambles are common to CD-SSBs and NCD-SSBs and the ROs are partitioned with a first set of ROs for CD-SSBs and a second set of ROs for NCD-SSBs. The gNB can also configure PRACH preambles and ROs that are common for CD-SSBs or NCD-SSBs, and any PRACH preamble and any RO can be used by a CD-SSB or an NCD-SSB. Additionally, or alternatively, the gNB can configure a mapping that associates PRACH preambles and/or ROs for CD-SSBs and for NCD-SSBs, wherein the mapping can include PRACH resources that are configured for either CD-SSBs or NCD-SSBs or can include PRACH resources that are configured for both CD-SSBs and NCD-SSBs. Additionally, a RACH configuration for NCD-SSBs can include parameters as a ra-ssb-OccasionMaskIndex that defines PRACH occasions, associated with an SSB, that the MAC entity can choose from for transmission of a Random Access Preamble by the physical layer, a powerRampingStep for power ramping steps for PRACH, a msg3-DeltaPreamble for Msg3 power.

When a gNB configures NCD-SSBs, a UE can select one or more NCD-SSBs, for example based on RSRP measurements being larger than a threshold, wherein the threshold can be provided by a SIB or by UE-specific RRC signaling. The UE can determine spatial settings to transmit PRACH in the corresponding ROs configured by the SIB or by UE-specific RRC signaling based on corresponding spatial settings of the one or more NCD-SSBs. A threshold can be configured by an RRC parameter rsrp-ThresholdNCDSSB so that a UE may select the NCD-SS block and corresponding PRACH resource for path-loss estimation and (re) transmission based on NCD-SSBs that satisfy the threshold. Alternatively, a single threshold can be applied for CD-SSBs and NCD-SSBs.

FIG. 9 illustrates an example method 900 for a UE transmitting a PRACH preamble in a set of ROs configured in a SIB according to embodiments of the present disclosure. The embodiment of the method 900 for a UE transmitting a PRACH preamble in a set of ROs configured in a SIB illustrated in FIG. 9 is for illustration only. FIG. 9 does not limit the scope of this disclosure to any particular implementation of the method 900 for a UE transmitting a PRACH preamble in a set of ROs configured in a SIB.

As illustrated in FIG. 9, in step 910, a UE (such as the UE 116) receives information by higher layers for a set of NCD-SSB indexes and a mapping between a set of ROs and the set of NCD-SSB indexes. In step 920, the UE selects one or more NCD-SSB, for example, based on RSRP measurements being above a threshold. In step 930, the UE transmits a PRACH using a first spatial setting associated with the selected NCD-SSB in the RO determined from the mapping to the NCD-SSB index. In step 940, the UE receives a PDCCH scheduling a RAR based on a second spatial setting corresponding to the selected NCD-SSB.

It is also possible that a maximum number of selected NCD-SSBs is configured and then the UE selects up to the maximum number of NCD-SSBs based on an ascending order of respective RSRPs that are above the threshold. It is also possible that none of the RSRPs are above the threshold and then the UE receives the PDCCH scheduling the RAR based on a spatial setting of a CD-SSB that the UE detected.

FIG. 10 illustrates an example method 1000 for a UE transmitting a PRACH preamble in a set of ROs configured in a SIB according to embodiments of the present disclosure. The embodiment of the method 1000 for a UE transmitting a PRACH preamble in a set of ROs configured in a SIB illustrated in FIG. 10 is for illustration only. FIG. 10 does not limit the scope of this disclosure to any particular implementation of the method 1000 for a UE transmitting a PRACH preamble in a set of ROs configured in a SIB.

As illustrated in FIG. 10, in step 1010, a UE (such as the UE 116) receives information by higher layers for a set of NCD-SSB indexes and a mapping between a set of ROs and the set of NCD-SSB indexes. In step 1020, the UE determines RSRP measurements based on NCD-SSB receptions, wherein the RSRP measurements are below a threshold. In step 1030, the UE transmits a PRACH using a first spatial setting associated with a CD-SSB. In step 1040, the UE receives a PDCCH scheduling a RAR based on a second spatial setting associated with a CD-SSB.

A gNB can configure, through a SIB or through UE-specific RRC signaling, sets of PRACH preambles wherein each set includes N preambles and each preamble can be part of only one set, sets of ROs wherein each set includes N ROs and each RO can be part of only one set, and a mapping for pairs of a preamble set and a RO set.

FIG. 11 illustrates an example method 1100 for a UE transmitting a PRACH preamble in an RO using a spatial setting according to embodiments of the present disclosure. The embodiment of the method 1100 for a UE transmitting a PRACH preamble in an RO using a spatial setting illustrated in FIG. 11 is for illustration only. FIG. 11 does not limit the scope of this disclosure to any particular implementation of the method 1100 for a UE transmitting a PRACH preamble in an RO using a spatial setting.

As illustrated in FIG. 11, at step 1110, a UE (such as the UE 116) receives information by higher layers for a set of NCD-SSB indexes and a mapping between a set of PRACH preambles and the set of NCD-SSB indexes. In step 1120, the UE selects one or more NCD-SSBs based on RSRP measurements being above a threshold, wherein the threshold is provided by higher layers. In step 1130, the UE transmits a PRACH preamble determined from the mapping to the NCD-SSB using a first spatial setting associated with the selected NCD-SSB. In step 1140, the UE receives a PDCCH scheduling a RAR based on a second spatial setting corresponding to the selected NCD-SSB.

FIG. 12 illustrates an example method 1200 for a UE transmitting a PRACH preamble in an RO using a spatial setting determined from a first and a second CD-SSB configuration, wherein the first and second CD-SSBs are associated to a same or a different cell according to embodiments of the present disclosure. The embodiment of the method 1200 for a UE transmitting a PRACH preamble in an RO using a spatial setting determined from a first and a second CD-SSB configuration, wherein the first and second CD-SSBs are associated to a same or a different cell illustrated in FIG. 12 is for illustration only. FIG. 12 does not limit the scope of this disclosure to any particular implementation of the method 1200 for a UE transmitting a PRACH preamble in an RO using a spatial setting determined from a first and a second CD-SSB configuration, wherein the first and second CD-SSBs are associated to a same or a different cell.

As illustrated in FIG. 12, in step 1210, a UE (such as the UE 116) receives information for a first set of CD-SSBs and a second set of CD-SSBs. In step 1220, the UE selects one or more CD-SSBs from the first set and one or more CD-SSBs from the second set based on RSRP measurements being above a first and a second threshold, respectively. In step 1220, the first and second thresholds are provided by higher layers in the first set of CD-SSBs configuration and in the second set of CD-SSBs configuration, respectively. In step 1230, the UE selects the one or more CD-SSBs of a set among the first and second sets based on the largest RSRP measurements. In step 1240, the UE transmits a PRACH in an RO using a first spatial setting associated with the selected CD-SSB. In step 1250, the UE receives a PDCCH scheduling a RAR based on a second spatial setting associated with the selected NCD-SSB.

When a UE performs measurements based on NCD-SSB receptions using different spatial settings in order to determine a spatial setting for a PRACH transmission, the UE can also provide a report to the gNB. The UE can report a channel quality, such as an RSRP, associated with the best spatial setting (for example, the spatial setting resulting to the largest measured RSRP) and/or a channel quality associated with multiple spatial settings, based on measurements from NCD-SSB receptions. For example, a report can be associated to the best and second best spatial settings (resulting to respective largest and second largest RSRP measurements). The report(s) associated to one or more spatial settings can be included in a Msg1/PRACH transmission for a 4-step RA procedure (or in a MsgA transmission for a 2-step RA procedure), wherein the UE transmits the Msg1 (or the MsgA) using the best spatial setting. It is also possible that the reports associated to multiple spatial settings are included in corresponding PRACH preamble transmissions. The PRACH preambles transmitted with different spatial settings can be same preamble or different preambles. The number of PRACH preamble transmissions, which can correspond to the number of reports to a gNB, can be configured by higher layers, for example in a SIB.

When a UE performs measurements using different spatial settings to determine a spatial setting for a Msg3 PUSCH transmission and/or PRACH transmission, the UE can include a report in the Msg3 PUSCH transmission. The report can include information for a number of one or more channel quality metrics and indexes of corresponding SSBs. For a UE indicated presence of NCD-SSBs within an active DL bandwidth, the channel quality can be determined from NCD-SSB receptions.

FIG. 13 illustrates an example method 1300 for a UE to perform RSRP measurements based on receptions of NCD-SSBs and to report information of a channel quality in a Msg3 PUSCH transmission according to embodiments of the present disclosure. The embodiment of the method 1300 for a UE to perform RSRP measurements based on receptions of NCD-SSBs and to report information of a channel quality in a Msg3 PUSCH transmission illustrated in FIG. 13 is for illustration only. FIG. 13 does not limit the scope of this disclosure to any particular implementation of the method 1300 for a UE to perform RSRP measurements based on receptions of NCD-SSBs and to report information of a channel quality in a Msg3 PUSCH transmission.

As illustrated in FIG. 13, in step 1310, a UE (such as the UE 116) is indicated presence of SSBs within an active DL bandwidth. In step 1320, the UE performs RSRP measurements of SSB receptions. In step 1330, the UE selects the largest RSRP measurement for a corresponding SSB index. In step 1340, the UE transmits Msg3 PUSCH using a spatial setting associated with the SSB of the largest RSRP measurement and reports information associated with the largest RSRP measurements and the SSB index. In step 1340, alternatively the UE can transmit Msg3 PUSCH using multiple spatial settings, for example transmitting Msg3 PUSCH with repetitions using multiple spatial settings and can report channel quality information in the first repetition or in all repetitions.

FIG. 14 illustrates an example method 1400 for a UE to perform RSRP measurements based on receptions of SSBs and to report information of a channel quality in a Msg3 PUSCH transmission according to embodiments of the present disclosure. The embodiment of the method 1400 for a UE to perform RSRP measurements based on receptions SSBs and to report information of a channel quality in a Msg3 PUSCH transmission illustrated in FIG. 14 is for illustration only. FIG. 14 does not limit the scope of this disclosure to any particular implementation of the method 1400 for a UE to perform RSRP measurements based on receptions of SSBs and to report information of a channel quality in a Msg3 PUSCH transmission.

As illustrated in FIG. 14, in step 1410, a UE (such as the UE 116) is indicated a first set of SSB indexes. In step 1420, the UE is indicated a second set of SSB indexes. In step 1430, the UE performs RSRP measurements based on receptions of SSBs associated with the first and second sets of SSB indexes. In step 1440, the UE selects the largest RSRP measurement for a corresponding SSB index. In step 1450, the UE transmits Msg3 PUSCH using the spatial setting associated with the SSB having the SSB index and reports information associated with the largest RSRP measurement or the SSB index.

When a UE is indicated presence of SS/PBCH blocks within an active DL bandwidth, a reliability of an UL transmission can be enhanced by considering that symbols configured for SSB receptions are not available for UL transmissions. A UE can be configured to count UL transmissions, for example PUSCH repetitions or PUCCH repetitions or PUSCH transmissions for TB processing over multiple slots, based on actual UL transmissions after considering that some of the symbols or slots configured or scheduled for the UL transmissions may not be available as determined based on a higher layer configuration. Such counting is referred to as counting based on available slots, and the UL transmission can be a PUSCH, or PUCCH, or SRS.

For unpaired spectrum, a UE can determine a number of NK consecutive slots for a PUSCH transmission of a PUSCH repetition type A scheduled by a DCI format, or for a PUSCH transmission of a PUSCH repetition Type B, with K repetitions, or for a PUSCH transmission of TB processing over multiple slots scheduled by a DCI format with N TB s, based on the TDRA information field value in the DCI format. When the UE is configured to count repetitions based on available slots, the UE determines NK slots based on TDD UL-DL configurations and on NCD-SSB configuration. For example, a slot is not counted in the number of NK slots for PUSCH transmission of a PUSCH repetition type A, or PUSCH transmission of a PUSCH repetition type B, or for PUSCH transmission of TB processing over multiple slots, or a combination thereof, if at least one of the symbols indicated by the TDRA field for the indexed row of the used TDRA table in the slot overlaps with a DL symbol indicated by TDD UL-DL configuration(s) or by NCD-SSB configuration that provides NCD-SSB indexes.

For paired spectrum and a SUL band, a UE determines a number of NK consecutive slots for a PUSCH transmission of a PUSCH repetition type A scheduled by a DCI format, or for a PUSCH transmission of a PUSCH repetition Type B, with K repetitions, or for a PUSCH transmission of TB processing over multiple slots scheduled by a DCI format, with N TB s, based on the TDRA information field value in the DCI format. For a reduced capability half-duplex UE that is configured to count repetitions based on available slots, the UE determines a number of slots for a PUSCH transmission of a PUSCH repetition type A scheduled by a DCI format, or for a PUSCH transmission of a PUSCH repetition type B, or for a PUSCH transmission of TB processing over multiple slots scheduled by a DCI format, based on the TDRA information field value in the DCI format, and a slot is not counted in the number of NK slots if at least one of the symbols indicated by the TDRA field for the indexed row of the used TDRA table in the slot overlaps with a symbol of an NCD-SSB with index provided by higher layers.

When a UE is indicated presence of SSBs within an active DL bandwidth, the UE can transmit Msg3 PUSCH with more than one spatial setting by repeating the Msg3 PUSCH transmission using different spatial settings that the UE determines based on the measurements from receptions of SSBs with corresponding SSB indexes indicated by higher layers. In a first example, the UE transmits a Msg3 PUSCH with repetitions using a number of spatial settings derived from RSRP values of SSB receptions and/or indicated in a SIB. In a second example, the UE transmits a Msg3 PUSCH with a spatial setting if an RSRP of a SSB reception is above a threshold indicated by higher layers, for example in a SIB.

FIG. 15 illustrates an example method 1500 for a UE to transmit Msg3 PUSCH with repetitions by cycling over spatial settings determined by measurements of SSBs having corresponding SSB indexes according to embodiments of the present disclosure. The embodiment of the method 1500 for a UE to transmit Msg3 PUSCH with repetitions by cycling over spatial settings determined by measurements of SSBs having corresponding SSB indexes illustrated in FIG. 15 is for illustration only. FIG. 15 does not limit the scope of this disclosure to any particular implementation of the method 1500 for a UE to transmit Msg3 PUSCH with repetitions by cycling over spatial settings determined by measurements of SSBs having corresponding SSB indexes.

As illustrated in FIG. 15, in step 1510, a UE (such as the UE 116) is indicated presence of NCD-SSBs within an active DL bandwidth. In step 1520, the UE determines spatial settings associated with best channel qualities, such as RSRPs, based on measurements of SSBs having corresponding SSB indexes. In step 1530, the UE transmits the Msg3 PUSCH with repetitions using the determined spatial settings.

FIG. 16 illustrates an example method 1600 for a UE to estimate path loss values associated to receptions of NCD-SSBs and used for determining a power for a Msg3 PUSCH transmission according to embodiments of the present disclosure. The embodiment of the method 1600 for a UE to estimate path loss values associated to receptions of NCD-SSBs and used for determining a power for a Msg3 PUSCH transmission illustrated in FIG. 16 is for illustration only. FIG. 16 does not limit the scope of this disclosure to any particular implementation of the method 1600 for a UE to estimate path loss values associated to receptions of NCD-SSBs and used for determining a power for a Msg3 PUSCH transmission.

As illustrated in FIG. 16, in step 1610, a UE (such as the UE 116) is indicated presence of NCD-SSBs within an active DL bandwidth. In step 1620, the UE determines a path loss from RSRP measurements based on receptions of NCD-SSBs. In step 1630, the UE determines a spatial setting associated with the smallest path loss and a transmit power based on the smallest path loss (largest RSRP) for a Msg3 PUSCH transmission. In step 1640, the UE transmits the Msg3 PUSCH with the determined power using the determined spatial setting.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a transceiver; and
   a controller coupled with the transceiver and configured to:
      receive, from a base station (BS), first information configuring a non-cell-defining synchronization signals and physical broadcast channel (SS/PBCH) block (NCD-SSB),
      receive, from the BS, second information configuring a random access channel which is dedicated for UEs associated with the NCD-SSB, and
      receive, from the BS, the NCD-SSB based on the first information,
   wherein the NCD-SSB is different from a cell-defining SS/PBCH block (CD-SSB) which is associated with remaining minimum system information (RMSI), and
   wherein a power related value of the NCD-SSB is same as a power related value of the CD-SSB.

2. The UE of claim 1, wherein the NCD-SSB is received in a radio resource control (RRC) connected state or an RRC inactive state, and
   wherein the first information includes at least one of
      a first value for a frequency of the NCD-SSB,
      a second value for a periodicity of the NCD-SSB, or
      a third value for a time offset between the CD-SSB and the NCD-SSB.

3. The UE of claim 1,
   wherein the CD-SSB and the NCD-SSB with a same index have a same quasi co-located (QCL) property, and
   wherein, for a half-duplex UE, a symbol for a reception of the NCD-SSB is not used for an uplink transmission.

4. The UE of claim 2, wherein the first information includes the second value for the periodicity of the NCD-SSB.

5. The UE of claim 2, wherein the first information includes the first value for the frequency of the NCD-SSB.

6. The UE of claim 2, wherein the first information includes the third value for the time offset between the CD-SSB and the NCD-SSB.

7. A base station (BS) in a wireless communication system, the BS comprising:
   a transceiver; and
   a controller coupled with the transceiver, and configured to
      transmit, to a user equipment (UE), first information configuring a non-cell-defining synchronization signals and physical broadcast channel (SS/PBCH) block (NCD-SSB), transmit, to the UE, second information configuring a random access channel which is dedicated for UEs associated with the NCD-SSB, and transmit, to the UE, the NCD-SSB based on the first information, wherein the NCD-SSB is different from a cell-defining SS/PBCH block (CD-SSB) which is associated with remaining minimum system information (RMSI), and wherein a power related value of the NCD-SSB is same as a power related value of the CD-SSB.

8. The BS of claim 7, wherein the NCD-SSB is transmitted in a radio resource control (RRC) connected state or an RRC inactive state, and wherein the first information includes at least one of
a first value for a frequency of the NCD-SSB,
a second value for a periodicity of the NCD-SSB, or
a third value for a time offset between the CD-SSB and the NCD-SSB.

9. The BS of claim 7, wherein the CD-SSB and the NCD-SSB with a same index have a same quasi co-located (QCL) property, and wherein, for a half-duplex UE, a symbol for a reception of the NCD-SSB is not used for an uplink transmission.

10. The BS of claim 7, wherein the CD-SSB and the NCD-SSB with a same index have a same quasi co-located (QCL) property, and wherein, for a half-duplex UE, a symbol for a reception of the NCD-SSB is not used for an uplink transmission.

11. The BS of claim 8, wherein the first information includes the first value for the frequency of the NCD-SSB, the second value for the periodicity of the NCD-SSB, and the third value for the time offset between the CD-SSB and the NCD-SSB.

12. A method performed by a user equipment (UE) in a wireless communication system, the method comprising:

receiving, from a base station (BS), first information configuring a non-cell-defining synchronization signals and physical broadcast channel (SS/PBCH) block (NCD-SSB), receiving, from the BS, second information configuring a random access channel which is dedicated for UEs associated with the NCD-SSB; and receiving, from the BS, the NCD-SSB based on the first information, wherein the NCD-SSB is different from a cell-defining SS/PBCH block (CD-SSB) which is associated with remaining minimum system information (RMSI), and wherein a power related value of the NCD-SSB is same as a power related value of the CD-SSB.

13. The method of claim 12, wherein the NCD-SSB is received in a radio resource control (RRC) connected state or an RRC inactive state, and wherein the first information is received via a UE specific RRC signaling, and includes at least one of
a first value for a frequency of the NCD-SSB,
a second value for a periodicity of the NCD-SSB, or
a third value for a time offset between the CD-SSB and the NCD-SSB.

14. The method of claim 12, wherein the CD-SSB and the NCD-SSB with a same index have a same quasi co-located (QCL) property, and wherein, for a half-duplex UE, a symbol for a reception of the NCD-SSB is not used for an uplink transmission.

15. The method of claim 13, wherein the first information includes the second value for the periodicity of the NCD-SSB.

16. The method of claim 13, wherein the first information includes the first value for the frequency of the NCD-SSB.

17. The method of claim 13, wherein the first information includes the third value for the time offset between the CD-SSB and the NCD-SSB.

* * * * *